United States Patent
Wu et al.

(10) Patent No.: US 12,515,559 B2
(45) Date of Patent: Jan. 6, 2026

(54) METHOD FOR DETERMINING COASTING TORQUE, STORAGE MEDIUM AND ELECTRONIC DEVICE

(71) Applicant: GREAT WALL MOTOR COMPANY LIMITED, Hebei (CN)

(72) Inventors: Maiqing Wu, Hebei (CN); Dandan Song, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 429 days.

(21) Appl. No.: 18/010,404

(22) PCT Filed: Nov. 5, 2021

(86) PCT No.: PCT/CN2021/129031
§ 371 (c)(1),
(2) Date: Dec. 14, 2022

(87) PCT Pub. No.: WO2022/100526
PCT Pub. Date: May 19, 2022

(65) Prior Publication Data
US 2023/0226952 A1    Jul. 20, 2023

(30) Foreign Application Priority Data
Nov. 10, 2020    (CN) .......................... 202011248102.7

(51) Int. Cl.
*B60L 58/30*    (2019.01)
*B60L 7/18*    (2006.01)
*B60L 15/20*    (2006.01)

(52) U.S. Cl.
CPC ................. *B60L 58/30* (2019.02); *B60L 7/18* (2013.01); *B60L 15/2009* (2013.01); *H01M 2250/20* (2013.01)

(58) Field of Classification Search
CPC ........ B60L 58/30; B60L 7/18; B60L 15/2009; B60L 50/70; B60L 2260/24;
(Continued)

(56) References Cited

U.S. PATENT DOCUMENTS 6,488,345 B1    12/2002    Woody et al.
2008/0136359 A1    6/2008    Chung et al.
(Continued)

FOREIGN PATENT DOCUMENTS

CN    101606260 A    12/2009
CN    104578232 A    4/2015
(Continued)

*Primary Examiner* — Kyle J Kingsland
(74) *Attorney, Agent, or Firm* — Nath, Goldberg & Meyer; Joshua B. Goldberg (57) ABSTRACT

A method for determining a coasting torque, a storage medium, and a computer program are provided, this method includes: obtaining operating parameters of an electric vehicle when a fuel cell system of the electric vehicle is out of operation and the electric vehicle enters a coasting state; determining a theoretical recovery torque and a correction torque of the electric vehicle according to the operating parameters, where the correction torque includes an additional torque of the fuel cell system; and correcting the theoretical recovery torque according to the correction torque to obtain the coasting torque of the electric vehicle. The coasting torque is used for energy recovery of the electric vehicle during a coasting process of the electric vehicle.

11 Claims, 3 Drawing Sheets

(58) Field of Classification Search
CPC .......... H01M 2250/20; H01M 8/04303; Y02T 10/72; Y02T 90/40
See application file for complete search history.

(56) References Cited

U.S. PATENT DOCUMENTS

| | | | |
|---|---|---|---|
| 2014/0203636 A1* | 7/2014 | Goetz | B60L 7/10 |
| | | | 307/10.1 |
| 2016/0141681 A1 | 5/2016 | Kakeno et al. | |
| 2019/0001984 A1* | 1/2019 | Huh | B60W 10/08 |
| 2020/0317061 A1* | 10/2020 | Oura | H01M 8/04201 |

FOREIGN PATENT DOCUMENTS

| | | | |
|---|---|---|---|
| CN | 105799693 A | 7/2016 | |
| CN | 107303818 A | 10/2017 | |
| CN | 109823202 A | 5/2019 | |
| CN | 110015212 A | 7/2019 | |
| CN | 110239356 A | 9/2019 | |
| CN | 110576749 A | 12/2019 | |
| CN | 110834625 A | 2/2020 | |
| CN | 111319470 A | 6/2020 | |
| CN | 111384418 A | 7/2020 | |
| CN | 111823891 A | 10/2020 | |
| JP | 2002054474 A | 2/2002 | |
| JP | 2009033966 A | 2/2009 | |
| KR | 20160022028 A | 2/2016 | |

* cited by examiner

METHOD FOR DETERMINING COASTING TORQUE, STORAGE MEDIUM AND ELECTRONIC DEVICE

CROSS-REFERENCE TO RELATED APPLICATIONS

This application is a 35 U.S.C. § 371 national phase application of PCT application No. PCT/CN2021/129031, filed on Nov. 5, 2021, which claims priority to Chinese patent application No. 202011248102.7 filed on Nov. 10, 2020 and entitled "method and apparatus for obtaining coasting torque, storage medium and computer program", the entire contents of which are incorporated herein by reference.

FIELD

The present disclosure relates to the technical field of new energy vehicles, and more particularly to a method for determining a coasting torque, a computer-readable storage medium.

DESCRIPTION OF RELATED ART

With the shortage of energy and the severity of environmental pollution, new energy vehicles have been rapidly developed, wherein electric vehicles using fuel cells as kinetic energy have become one of the main research directions of new energy vehicles.

A fuel cell using hydrogen energy as fuel does not generate hazardous gas and hazardous substances such as $CO_2$, $NO_x$, $SO_x$ and the like in a chemical reaction process, so that a pollution to the environment is avoided. However, the fuel cell has the deficiencies of softer characteristic curve and slower power response, when the fuel cell system is out of operation, chemical reactions are performed in the fuel cell and electric energies are continued to be provided, such that the vehicle is still in a moving state with accelerated speed or constant speed.

SUMMARY

An objective of the present disclosure is to provide a method for determining a coasting torque, a storage medium and an electronic device, which aims at solving the technical problem in the prior art that a chemical reaction is still performed in the fuel cell and electric energies are continued to be provided after the fuel cell system is out of operation, such that the vehicle is still in a moving state with accelerated speed or constant speed.

According to the first aspect of the embodiments of the present disclosure, a method for determining a coasting torque implemented by an electronic device and applied to an electric vehicle, the method includes:
    obtaining operating parameters of the electric vehicle when a fuel cell system of the electric vehicle is out of operation and the electric vehicle enters a coasting state;
    determining a theoretical recovery torque and a correction torque of the electric vehicle according to the operating parameters, wherein the correction torque comprises an additional torque of the fuel cell system; and
    correcting the theoretical recovery torque to determine the coasting torque of the electric vehicle according to the correction torque. Where the coasting torque is used for energy recovery of the electric vehicle during a coasting process of the electric vehicle.

In one embodiment, said correcting the theoretical recovery torque according to the correction torque includes:
    substituting the theoretical recovery torque and the additional torque into a first calculation formula to obtain the coasting torque of the electric vehicle;
    the first calculation formula is expressed as $F_t - F_{fc} = F_c$,
    $F_t$ represents the theoretical recovery torque, $F_{fc}$ represents the additional torque, and $F_c$ represents the coasting torque.

In one embodiment, the operating parameters include an additional power generated by the fuel cell system and a vehicle speed of the electric vehicle, and the method further includes:
    determining the additional torque of the fuel cell system of the electric vehicle according to the additional torque and the vehicle speed, and a pre-calibrated mapping relationship between an additional power, a vehicle speed and an additional power.

In one embodiment, the correction torque further includes a load torque, said correcting the theoretical recovery torque according to the correction torque includes:
    substituting the theoretical recovery torque, the additional torque and the load torque into a second calculation formula to determine the coasting torque of the electric vehicle;
    where the second calculation formula is expressed as: $F_t - F_{fc} + F_{fmp} = F_c$,
    where $F_t$ represents the theoretical recovery torque, $F_{fc}$ represents the additional torque, $F_c$ represents the coasting torque, and $F_{fmp}$ represents the load torque.

In one embodiment, the operating parameters include a power consumption of a load of the electric vehicle and the vehicle speed of the electric vehicle, and the method further includes:
    determining the load torque of the electric vehicle according to the power consumption of the load and the vehicle speed, and a pre-calibrated mapping relationship between the power consumption of the load, the vehicle speed and the load torque.

According to the second aspect of the present disclosure, a computer program is provided in the present disclosure, the computer program includes a computer-readable code, that, when executed by a computer device, causes the computer device to perform the aforesaid method for obtaining the coasting torque.

According to the third aspect of the present disclosure, a non-transitory computer-readable storage medium is provided in the present disclosure, the non-transitory computer-readable storage medium stores the computer program provided in the embodiment of the third aspect of the present disclosure, that, when executed by a processor, causes the processor to implement the method for determining the coasting torque.

According to the fourth aspect of the present disclosure, an electronic device is provided in the present disclosure, the electronic device includes:
    a memory which stores a computer program;
    a processor configured to execute the computer program stored in the memory to implement the aforesaid method for determining the coasting torque.

The technical solutions provided in the embodiments of the present disclosure may include the following beneficial effects: in the method for determining coasting torque of the present disclosure, when the fuel cell system is out of operation and the electric vehicle enters the coasting state, the shutdown characteristic of the fuel cell system is considered, the theoretical recovery torque is corrected, so that the coasting torque is determined. Energy recovery is performed by the electric vehicle according to the coasting torque in the coasting process. A condition that the electric vehicle is still in the moving state with accelerated speed or constant-speed after the fuel cell system is out of operation is avoided, so that a user can feel a deceleration process of the vehicle intuitively after the accelerator pedal of the electric vehicle is released, and an user experience is improved.

Additional aspects and advantages of the present disclosure will be described in the following description, a part of the additional aspects and advantages of the present disclosure will become apparent from the following descriptions, or be understood from the practice of the present disclosure.

BRIEF DESCRIPTION OF THE DRAWINGS

The aforesaid and/or additional aspects and advantages of the present disclosure will become apparent and more understandable according to the following descriptions of the embodiments with reference to the accompanying figures. In the figures.

DETAILED DESCRIPTION OF EMBODIMENTS

Exemplary embodiments will be described in detail hereinafter, examples of the exemplary embodiments are illustrated in the accompanying drawings. When the following description relates to the accompanying drawings, the same number in different accompanying drawings represents the same or similar elements, unless otherwise representation of this number is defined. The implementations described in the following description of the exemplary embodiments do not represent all implementations consistent with the present disclosure. Instead, they are merely some examples of the apparatus and the method being consistent with some aspects of the present disclosure, as recited in detail in the appended claims.

It should be noted that, in the present disclosure, terms such as "S101", "S 102" in the specification, the claims, and the accompanying drawings are used to distinguish the steps, these terms are not necessarily to be interpreted as performing the method steps in a designated order or sequence.

Embodiments of the present disclosure will be described in detail below with reference to the accompanying drawings. It should be understood that the embodiments described herein are only intended to illustrate and explain the present disclosure, rather than limiting the present disclosure.

Before describing the method for determining a coasting torque, the computer-readable storage medium, and the electronic device according to the embodiments of the present disclosure, the application scenario of the present disclosure is introduced first. The method for determining the coasting torque according to the present disclosure may be applied to an automobile, and the automobile may be an electric vehicle.

With the shortage of energy and the severity of environmental pollution, the type of electric vehicle which uses a fuel cell as a kinetic energy has become one of the main research directions of new energy vehicles. A fuel cell which uses hydrogen energy as fuel is operated by converting chemical energy into electric energy or mechanical energy through chemical reaction between hydrogen and oxygen, and storing the converted electric energy or mechanical energy in a storage battery, or using the converted electric energy or the converted mechanical energy as kinetic energy for driving the vehicle to move on the road. Since hazardous gas and hazardous substances such as $CO_2$, $NO_x$ and $SO_x$ are not generated during the chemical reaction process of hydrogen and oxygen, so that the general emission of the electric vehicle using the aforesaid fuel cell is water. The pollution to the environment is further avoided. Furthermore, the hydrogen resources are rich and are convenient to be acquired, so that energy shortage would not be caused.

Figure 1:
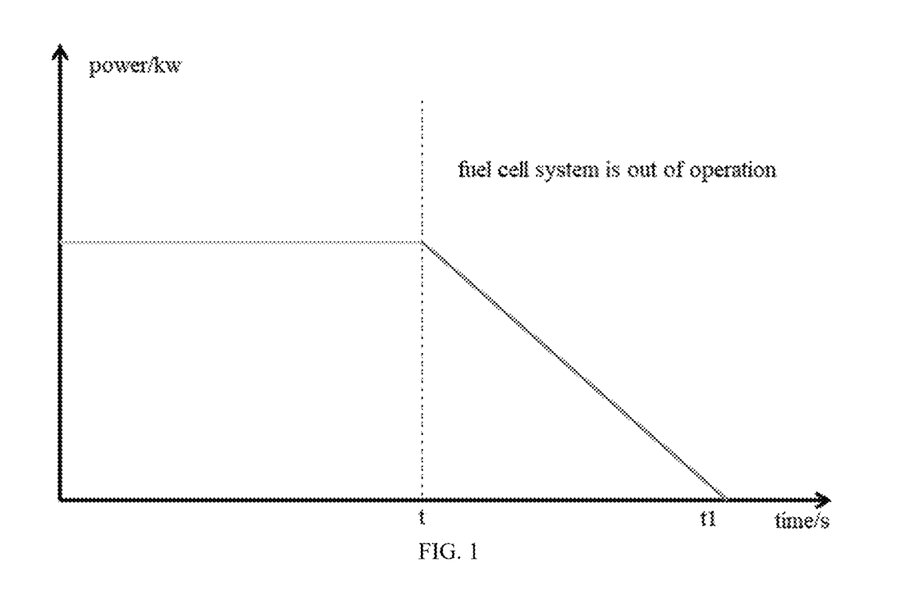
FIG. 1 is a schematic flowchart of a correlation between power and time after the fuel cell system is out of operation.

However, during a moving process of the electric vehicle, a fuel cell system continuously outputs a certain power when it is in an operation state, as shown in FIG. 1. After the user releases the accelerator pedal at a time t, the fuel cell system switches from the operating state to a standby state (i.e., the fuel cell system stops supplying fuel at the time t), and the electric vehicle enters a coasting state for energy recovery, this is because that the fuel cell is still operating for a period of time after the fuel cell system switches from the operating state into the standby state. With the consumption of hydrogen, the power output by the fuel cell is gradually reduced until the fuel cell stops outputting power (i.e., the output power is zero at time t1 in FIG. 1). The fuel cell system is out of operation, that is, the fuel cell system switches from the operating state into the standby state. At this time, the fuel cell system no longer provides fuel supply and no longer supplies fuel cell active materials to the external. The chemical reactions in the fuel cell are continuously performed until the active materials externally supplied to the fuel cell are all consumed by reaction. The chemical reaction in the fuel cell is stopped. The fuel cell outputs power continuously during a time period between the time point when the fuel cell system is switched to the standby state and the time when the chemical reaction in the fuel cell is stopped, the power is no longer output after the chemical reaction in the fuel cell is stopped. The output power generated between the time point t and the time point t1 continues to drive the electric vehicle to move on the road, thereby causing the electric vehicle to be in a moving state with an accelerated speed or a constant-speed between the time point t and the time point t1, and thereby bring an unreal feeling that the accelerator pedal malfunctions, and the fuel cell continuously outputs kinetic energy to the user.

Figure 2:
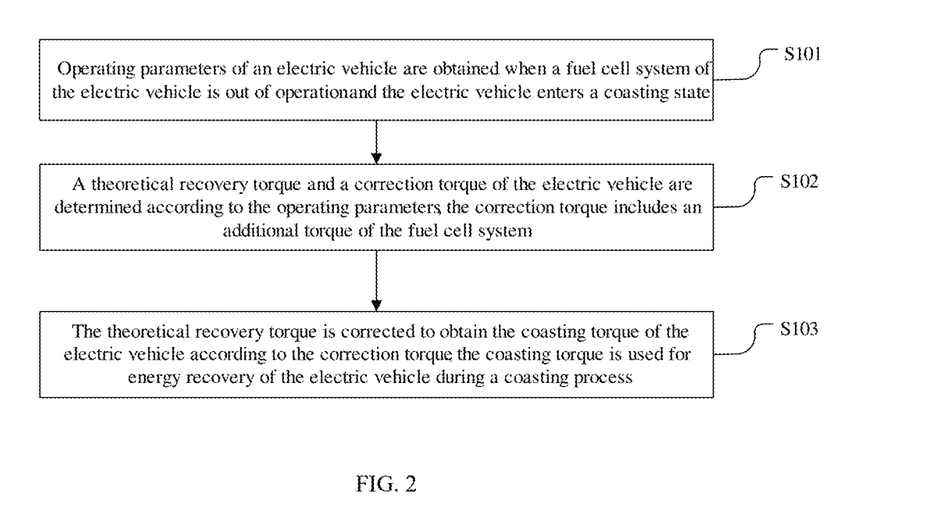
FIG. 2 is a schematic flowchart of a method for obtaining a coasting torque as illustrated in one exemplary embodiment.

In order to solve the aforesaid technical problem, a method for determining a coasting torque is provided in the present disclosure. The method is applied to electric vehicles. FIG. 2 illustrates a schematic flowchart of the method for determining the coasting torque according to one exemplary embodiment. As shown in FIG. 2, this method includes the following steps:

In a step of S101, operating parameters of the electric vehicle is obtained when the fuel cell system of the electric vehicle is out of operation and the electric vehicle enters a coasting state.

In a step of S102, a theoretical recovery torque and a correction torque of the electric vehicle are determined according to the operating parameters of the electric vehicle. The correction torque includes an additional torque of the fuel cell system.

In a step of S103, the theoretical recovery torque is corrected according to the correction torque, so that the coasting torque of the electric vehicle is obtained. The coasting torque is used for energy recovery of the electric vehicle during a coasting process of the electric vehicle.

Where the additional torque of the fuel cell system may be a torque corresponding to the electric energy generated due to continuous reaction of the fuel cell after the fuel cell system is out of operation.

According to the method for determining the coasting torque of the present disclosure, when the fuel cell system is out of operation and the electric vehicle enters the coasting state, a shutdown characteristic of the fuel cell system is considered, the theoretical recovery torque is corrected to obtain the coasting torque. The electric vehicle performs energy recovery according to the coasting torque in the coasting process, so that a condition that the electric vehicle is still in a moving state with accelerated speed or constant-speed after the fuel cell system is out of operation is avoided. A user can intuitively feel a deceleration process of the vehicle after the accelerator pedal is released, and a user experience is improved.

In particular, under the condition that the operating parameters include a driving mode, a coasting-energy-recovery-level, and a vehicle speed of the electric vehicle, in the step of S102, the theoretical recovery torque of the electric vehicle is determined according to the operating parameters may include:

the theoretical recovery torque of the electric vehicle is determined according to the driving mode of the electric vehicle, the coasting-energy-recovery-level and the vehicle speed, and a pre-calibrated mapping relationship between the driving mode, the coasting-energy-recovery-level, the vehicle speed and the theoretical recovery torque.

In particular, the pre-calibrated driving mode includes: a normal mode, an economic mode, a motion mode, and a charge-sustaining mode. Different driving modes include a high energy recovery level, a medium energy recovery level, and a low energy recovery level.

In particular, the coasting-energy-recovery-levels under different driving modes are shown in table 1 below.

TABLE 1

| | driving mode | | | |
|---|---|---|---|---|
| | normal mode | economic mode | motion mode | charge-sustaining mode |
| low | 0.7 m/s$^2$ | 0.7 m/s$^2$ | 0.6 m/s$^2$ | 0.7 m/s$^2$ |
| medium | 0.9 m/s$^2$ | 0.9 m/s$^2$ | 0.8 m/s$^2$ | 0.9 m/s$^2$ |
| high | 1.2 m/s$^2$ | 1.2 m/s$^2$ | 1.0 m/s$^2$ | 1.2 m/s$^2$ |

Where, all coasting-energy-recovery-levels are calibration values.

In particular, the charge-sustaining mode is a unique mode for a plug-in hybrid electric vehicle (Plug-in Hybrid Electric Vehicle, PHEV).

For example, a standard electric quantity of the battery of the PHEV is set as 70% of battery capacity, and a variable electric quantity parameter is set as 10%. In the condition that the PHEV is in the charge-sustaining mode, the standard electric quantity of the storage battery is reduced to 60% of battery capacity, and the engine is in a rest state, the engine is automatically started to generate electric power, some of the electric powers is supply for operation of the vehicle, some of the electric powers is used for charging the storage battery, and the charging of the storage battery is stopped after the electric quantity of the storage battery reaches 70% (at this time, the engine continues to be operated or enters the rest state according to the current working condition of the vehicle). If the standard electric quantity of the storage battery is reduced to 60% of battery capacity, the engine is in the operation state and there is no redundant electric quantity for charging the storage battery, the engine continues to be operated until the engine generates redundant electric quantity for charging the storage battery, and charging for the storage battery is stopped when the electric quantity of the storage battery reaches 70% of battery capacity.

For example, in the high coasting-energy-recovery-level, the mapping relationship between the driving modes, the vehicle speeds, and the theoretical recovery torques is shown in table 2 below.

TABLE 2

| | Vehicle speed km/h | | | | | | | | | |
|---|---|---|---|---|---|---|---|---|---|---|
| | 120 | 110 | 100 | 90 | 80 | 60 | 40 | 20 | 10 | 0 |
| Normal mode | 100 Nm | 90 Nm | 80 Nm | 70 Nm | 60 Nm | 50 Nm | 40 Nm | 30 Nm | 20 Nm | 0 Nm |
| Economic mode | 100 Nm | 90 Nm | 80 Nm | 70 Nm | 60 Nm | 50 Nm | 40 Nm | 30 Nm | 20 Nm | 0 Nm |
| Motion mode | 90 Nm | 80 Nm | 70 Nm | 60 Nm | 50 Nm | 40 Nm | 30 Nm | 50 Nm | 10 Nm | 0 Nm |
| Charge-sustaining mode | 100 Nm | 90 Nm | 80 Nm | 70 Nm | 60 Nm | 50 Nm | 40 Nm | 30 Nm | 20 Nm | 0 Nm |

Where, all theoretical recovery torques are calibration values.

The electric vehicle is currently in the economic mode under a high coasting-energy-recovery-level, the theoretical recovery torque is 100 Nm when the vehicle speed of the electric vehicle is 120 km/s.

Due to the shutdown characteristic of the fuel cell system, after the fuel cell system is shut down, the fuel cell will continue to provide energy for the electric vehicle to drive the electric vehicle to move, so that the theoretical recovery torque of the electric vehicle needs to be corrected with reference to the shutdown characteristic of the fuel cell system.

In one embodiment, in the step of S103, the theoretical recovery torque is corrected according to the correction torque may include:

the theoretical recovery torque and the additional torque are substituted into a first calculation formula to obtain the coasting torque of the electric vehicle.

The first calculation is expressed as: $F_t - F_{fc} = F_c$,

Where $F_t$ represents the theoretical recovery torque, $F_{fc}$ represents the additional torque, and $F_c$ represents the coasting torque.

In particular, since the theoretical recovery torque provides a braking force for the electric vehicle, and the additional torque of the fuel cell system provides the driving force for driving the electric vehicle to move ahead on the road, the directions of the two forces are opposite to each other. Thus, correcting the theoretical recovery torque according to the additional torque includes: subtracting the additional torque of the fuel cell system from the theoretical recovery torque to obtain the coasting torque.

In one embodiment, when the operating parameters include the additional power generated by the fuel cell system and the vehicle speed of the electric vehicle, the additional torque in the step S103 may be determined in the following manner:

the additional torque of the fuel cell system of the electric vehicle is determined according to the additional power and the vehicle speed, and a pre-calibrated mapping relationship between the additional power and the vehicle speed, and the additional torque.

In particular, due to the fact that the torque converted from the electric energy generated by the fuel cell system and transmitted to a wheel end of the electric vehicle is a ratio of the power output by the current fuel cell system to the vehicle speed, thus, determining the additional torque of the fuel cell system of the electric vehicle according to the additional power and the vehicle speed, and the pre-calibrated mapping relationship between the additional power, the vehicle speed and the additional torque includes:

the additional power and the vehicle speed are substituted into a third calculation formula that characterizes the mapping relationship between the additional power, the vehicle speed, and the additional torque to determine the additional torque of the fuel cell system of the electric vehicle.

Where, the third calculation formula is expressed as: $F_{fc}=P_{fc}/v$, $F_{fc}$ represents the additional torque, $P_{fc}$ represents the additional power, and v represents the vehicle speed.

Based on the consideration of the shutdown characteristics of the fuel cell system, the torque that needs to be provided for the power consumption of each load on the electric vehicle can be further considered, and the theoretical recovery torque of the electric vehicle is further corrected.

In one embodiment, the correction torque further includes a load torque. In the step of S103, the theoretical recovery torque is corrected according to the correction torque may include:

the theoretical recovery torque, the additional torque and the load torque are substituted into a second calculation formula to obtain the coasting torque of the electric vehicle;

the second calculation formula is expressed as: $F_t-F_{fc}+F_{fmp}=F_c$, where, $F_t$ represents the theoretical recovery torque, $F_{fc}$ represents the additional torque, $F_c$ represents the coasting torque, and $F_{fmp}$ represents the load torque.

The load torque is the torque required for power consumption of the load. The load includes an air compressor, an air circulation pump, a DC-to-DC converter, and the like.

In particular, since the load torque provides the braking force for the electric vehicle when the electric vehicle fuel cell system is out of operation and the electric vehicle enters the coasting state. Thus, correcting the theoretical recovery torque according to the additional torque and the load torque includes: subtracting the additional torque of the fuel cell system from the theoretical recovery torque, and adding the load torque of the electric vehicle to obtain the coasting torque.

According to the method for determining the coasting torque according to the present disclosure, under the condition of the consideration of the shutdown characteristic of the fuel motor system, torques required for power consumption of the various loads of the electric vehicle are further considered, and the theoretical recovery torque is further corrected. Thus, an optimization of the existing coasting torque determination strategy is realized, and the electric vehicle which performs energy recovery in the coasting state according to the coasting torque has a shorter coasting distance as compared to other new energy vehicles.

In one embodiment, when the operating parameters include the power consumption of the load of the electric vehicle and the vehicle speed of the electric vehicle, the load torque in the step S103 may be determined in the following manner:

the load torque of the electric vehicle is determined according to the power consumption of the load and the vehicle speed, and the pre-calibrated mapping relationship between the power consumption of the load, the vehicle speed and the load torque.

Where the load torque is the torque required to be provided for the power consumption of the load of the electric vehicle.

In particular, the load torque is a ratio of the load power to the vehicle speed, thus, said determining the load torque of the electric vehicle according to the power consumption of the load and the vehicle speed, and the pre-calibrated mapping relationship between the power consumption of the load, the vehicle speed and the load torque may include:

substituting the power consumption of the load and the vehicle speed into a fourth calculation formula that characterizing a mapping relationship between the power consumption of the load, the vehicle speed and the load torque to determine the load torque of the electric vehicle.

The fourth calculation formula is expressed as $F_{fmp}=P_{fmp}/v$, where $F_{fmp}$ represents a load torque, $P_{fmp}$ represents a power consumption of the load, and v represents a vehicle speed.

In particular, when the load power includes a boost power of the DC-to-DC converter, a buck power of the DC-to-DC converter, a power of the air compressor, and a power of the air circulation pump, the load torque is the sum value of the boost torque of the DC-to-DC converter, the buck torque of the DC-to-DC converter, the torque of the air compressor, and the torque of the air circulation pump.

The boost torque of the DC-to-DC converter is a ratio of a boost power of the DC-to-DC converter to the vehicle speed, the buck torque of the DC-to-DC converter is a ratio of a buck power of the DC-to-DC converter to the vehicle speed, the torque of the air compressor is a ratio of the power of the air compressor to the vehicle speed, and the torque of the air circulation pump is a ratio of the power of the air circulation pump to the vehicle speed.

In this condition, the calculation formula of the load torque is expressed as:

$$F_{fmp} = P_{dc}/v + P_{fdc}/v + P_{fac}/v + P_{fp}/v,$$

where, $F_{fmp}$ represents a load torque, $P_{dc}$ represents the buck power of the DC-to-DC converter, $P_{fdc}$ represents the boost power of the DC-to-DC converter, $P_{fac}$ represents the power of the air compressor, $P_{fp}$ represents the power of the air circulation pump, v represents the vehicle speed.

A non-transitory computer-readable storage medium is further provided in one embodiment of the present disclosure, this non-transitory computer-readable storage medium stores a computer program code that, when executed by a processor, causes the processor to perform the steps of the method for determining the coasting torque in a coasting process of an electric vehicle.

In particular, the computer-readable storage medium may be a flash memory, a hard disk, a multimedia card, a card-type memory (e.g., SD or DX memory, etc.), a random access memory (Random Access Memory, RAM), a static random access memory (Static Random Access Memory, SRAM), a read-only memory (Read-Only Memory, ROM), an electrically erasable programmable read-only memory (Electrically Erasable Programmable Read-Only Memory, EEPROM), a programmable read-only memory (Programmable Read-Only Memory, PROM), a magnetic memory, a magnetic disk, an optical disk, a server, etc.

Regarding the computer-readable storage medium in the above-mentioned embodiment, when the computer program stored in the computer-readable storage medium are executed, the steps of the method for starting the vehicle have been described in detail in the relevant method embodiment, thus, these steps of the method for starting the vehicle will not be described in detail herein.

An electronic device is further provided in this embodiment, this electronic device includes:
a memory which stores a computer program;
a processor configured to execute the computer program stored in the memory to implement the steps in the aforesaid method for determining the coasting torque.

According to the method for obtaining the coasting torque of the present disclosure, when the fuel cell system is out of operation and the electric vehicle enters the coasting state, the shutdown characteristic of the fuel cell system is considered, the theoretical recovery torque is corrected to obtain the coasting torque. The electric vehicle performs energy recovery according to the coasting torque in the coasting process, so that a condition that the electric vehicle is still in a moving state with accelerated speed or constant-speed after the fuel cell system is out of operation is avoided, the user can intuitively feel a deceleration process of the vehicle after the accelerator pedal is released, and the user experience is improved. Under the condition of the consideration of the shutdown characteristic of the fuel motor system, torques required for power consumption of the various loads of the electric vehicle are further considered, and the theoretical recovery torque is further corrected. Thus, an optimization of the existing coasting torque determination strategy is realized, and the electric vehicle which performs energy recovery in the coasting state according to the coasting torque has a shorter coasting distance as compared to other new energy vehicles.

Figure 3:
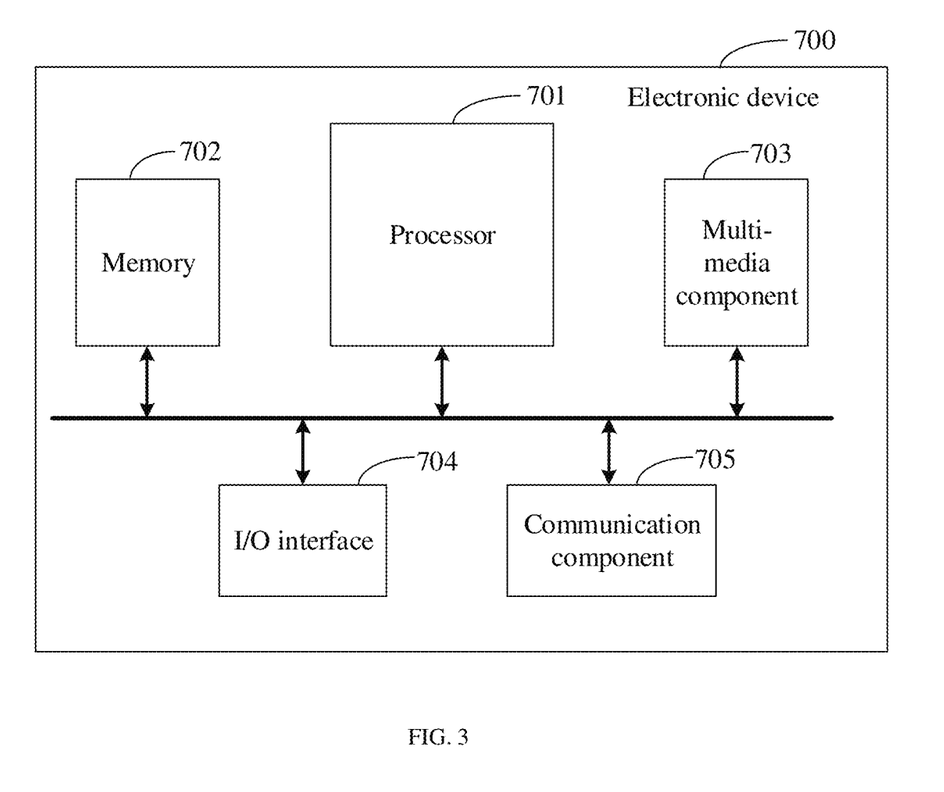
FIG. 3 illustrates a schematic block diagram of an electronic device as illustrated in one exemplary embodiment.

FIG. 3 is a block diagram of an electronic device 700 according to one exemplary embodiment. The electronic device 700 may be applied to a vehicle. As shown in FIG. 3, the electronic device 700 may include a processor 701 and a memory 702. The electronic device 700 may further include one or more of a multimedia component 703, an input/output (I/O) interface 704, and a communication component 705.

Where, the processor 701 is configured to control an overall operation of the electronic device 700 so as to complete all or some of the steps in the method for determining the coasting torque.

The memory 702 is configured to store various types of data so as to support the operation of the electronic device 700. The data may include such as instructions for any application program or method operating on the electronic device 700 and application-related data, such as state parameters of an electric vehicle.

The memory 702 may be implemented by any type of volatile or non-volatile storage device or a combination thereof, such as a static random access memory (Static Random Access Memory, SRAM), an electrically erasable programmable read-only memory (Electrically Erasable Programmable Read-Only Memory, EEPROM), an erasable programmable read-only memory (Erasable Programmable Read-Only Memory, EPROM), a magnetic memory, a flash memory, a magnetic disc, and an optical disc.

The multimedia component 703 may include a screen and an audio component. Where the screen may be such as a touch screen, the audio component is configured to output and/or input an audio signal. For example, the audio component may include a microphone for receiving an external audio signal. The received audio signal may be further stored in the memory 702 or transmitted through the communication component 705. The audio component further includes at least one speaker for outputting audio signal.

An input/output (Input/Output, I/O) interface 704 provides an interface between the processor 701 and other interface modules, the aforesaid other interface modules may be keyboards, mouse, buttons/keys, or the like. These buttons may be virtual keys or physical buttons.

The communication component 705 is configured to perform a wired or wireless communication between the electronic device 700 and other devices. The wireless communication can be such as Wi-Fi, Bluetooth, near field communication (Near Field Communication, NFC), 2G (Second Generation Telecommunication), 3G (Third Generation Telecommunication), 4G (Fourth Generation Telecommunication), NB-IoT, eMTC (enhanced Machine-Type Communication), or other 5G (Fifth Generation Telecommunication), etc., or a combination of one or more thereof, the wireless communication is not limited herein. Accordingly, the corresponding communication component 705 may include a Wi-Fi module, a Bluetooth module, a near field communication (Near Field Communication, NFC) module, and the like.

In one exemplary embodiment, the electronic device 700 may be implemented by one or more of an application specific integrated circuit (Application Specific Integrated Circuit, ASIC), digital signal processor (Digital Signal Processors, DSP), digital signal processing device (Digital Signal Processing Device, DSPD), programmable logic devices (Programmable Logic Device, PLD), field programmable gate arrays (Field Programmable Gate Array, FPGA), controller, micro-controller, microprocessor, or other electronic component.

In order to implement the aforesaid embodiments, a computer program product is further provided in the present disclosure, the computer program product includes a computer program executable by a programmable device, the computer program has code portions of the method for obtaining the coasting torque.

In order to implement the aforesaid embodiments, a non-transitory computer-readable storage medium is provided in the present disclosure, the computer program can be stored in the non-transitory computer-readable storage medium.

Figure 4:
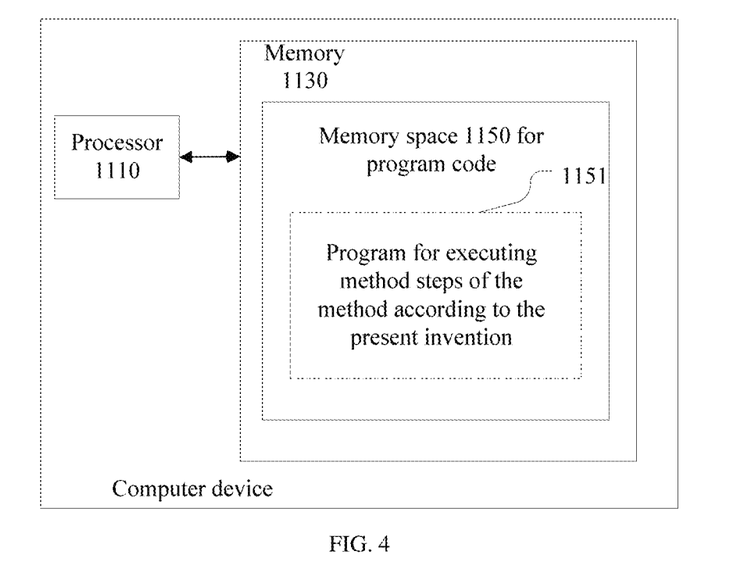
FIG. 4 illustrates a schematic structural block diagram of a computer device provided by one embodiment of the present disclosure.
Figure 5:
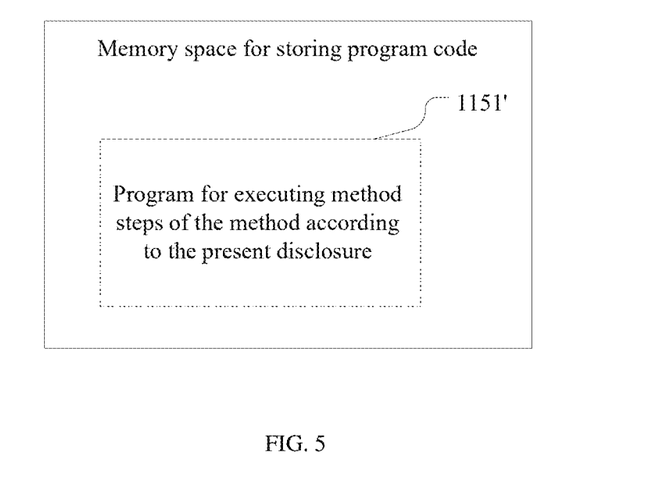
FIG. 5 illustrates a schematic block diagram of a memory unit for portably or fixedly implementing the program code of the method of the present disclosure according to one embodiment of the present disclosure.

FIG. 4 illustrates a schematic structural diagram of the computer device according to one embodiment of the present disclosure. The computer device generally includes a processor 1110 and a computer program product or computer-readable medium in the form of memory 1130. The memory 1130 may be an electronic memory such as a flash memory, an electrically erasable programmable read-only memory (Electrically Erasable Programmable Read-Only Memory, EEPROM), an erasable programmable read-only memory (Erasable Programmable Read-Only Memory, EPROM), a hard disk, or a read-only memory (Read-Only Memory, ROM). The memory 1130 has a storage space 1150 for executing a program code 1151 of the method steps in the method for determining coasting torque. These program codes may be read out from one or more computer program products or be written into the one or more computer program products. These computer program products include a program code carrier such as a hard disk, a compact disc (Compact Disc, CD), a memory card, or a floppy disk. This computer program product is generally a portable or fixed storage unit as shown in FIG. 5. The storage unit may have a storage segment, or a storage space arranged in a manner similar to that of the memory 1130 in the computer device of FIG. 4. The program code may be compressed, for example, the program code may be compressed in an appropriate form. Generally, the storage unit includes a computer-readable code 1151' (i.e., a code that can be read by a processor such as the processor 1110), that, when executed by the computer device, causes the computer device to perform the various steps in the method for obtaining coasting torque as described above.

The preferable embodiments of the present disclosure are described in detail with reference to the accompanying drawings. However, the present disclosure is not limited to the specific details in the embodiments, various simple modifications can be made to the technical solutions of the present disclosure within the technical concept of the present disclosure, and these simple modifications are included in the protection scope of the present disclosure.

Furthermore, it needs to be noted that the detailed technical features described in the specific embodiments may be combined in any suitable manner without contradiction. In order to avoid unnecessary repetition, these various possible combinations will not be described in the present disclosure.

In addition, the various embodiments of the present disclosure may also be combined in any manner, as long as the combination of the various embodiments does not depart from the idea of the present disclosure. The combination of the various embodiments should also be regarded as the contents disclosed in the present disclosure.

What is claimed is:

1. A method for energy recovery for an electric vehicle, implemented by an electronic device comprising a processor, the method comprising:
    by the processor of the electronic device, obtaining operating parameters of the electric vehicle when a fuel cell system of the electric vehicle is out of operation and the electric vehicle enters a coasting state;
    by the processor of the electronic device, determining a theoretical recovery torque and a correction torque of the electric vehicle according to the operating parameters, wherein the correction torque comprises an additional torque of the fuel cell system, and the additional torque of the fuel cell system is a torque corresponding to an electric energy generated due to continuous reaction of a fuel cell of the fuel cell system after the fuel cell system is out of operation;
    by the processor of the electronic device, correcting the theoretical recovery torque to determine the coasting torque of the electric vehicle according to the correction torque, and controlling the electric vehicle to perform energy recovery according to the coasting torque in a coasting process of the electric vehicle;
    wherein the operating parameters comprise a driving mode, a coasting-energy-recovery-level and a vehicle speed of the electric vehicle, said determining the theoretical recovery torque and the correction torque of the electric vehicle according to the operating parameters comprises:
    determining the theoretical recovery torque of the electric vehicle according to the driving mode of the electric vehicle, the coasting-energy-recovery-level and the vehicle speed, and a pre-calibrated mapping relationship between the driving mode, the coasting-energy-recovery-level, the vehicle speed and the theoretical recovery torque.

2. The method according to claim 1, wherein said by the processor of the electronic device, correcting the theoretical recovery torque according to the correction torque comprises:
    by the processor of the electronic device, substituting the theoretical recovery torque and the additional torque into a first calculation formula to obtain the coasting torque of the electric vehicle;
    the first calculation formula is expressed as $F_t - F_{fc} = F_c$,
    wherein $F_t$ represents the theoretical recovery torque, $F_{fc}$ represents the additional torque, and $F_c$ represents the coasting torque.

3. The method according to claim 2, wherein the operating parameters comprise an additional power generated by the fuel cell system and the vehicle speed of the electric vehicle, and the method further comprises:
    by the processor of the electronic device, determining the additional torque of the fuel cell system of the electric vehicle according to the additional power and the vehicle speed, and a pre-calibrated mapping relationship between the additional power and the vehicle speed, and an additional the additional torque.

4. The method according to claim 1, wherein the correction torque further comprises a load torque, said by the processor of the electronic device, correcting the theoretical recovery torque according to the correction torque comprises:
    by the processor of the electronic device, substituting the theoretical recovery torque, the additional torque and the load torque into a second calculation formula to determine the coasting torque of the electric vehicle;
    wherein the second calculation formula is expressed as: $F_t - F_{fc} + F_{fmp} = F_c$,
    wherein $F_t$ represents the theoretical recovery torque, $F_{fc}$ represents the additional torque, $F_c$ represents the coasting torque, and $F_{fmp}$ represents the load torque.

5. The method according to claim 4, wherein the operating parameters comprise a power consumption of a load of the electric vehicle and the vehicle speed of the electric vehicle, and the method further comprises:
    by the processor of the electronic device, determining the load torque of the electric vehicle according to the power consumption of the load and the vehicle speed, and a pre-calibrated mapping relationship between the power consumption of the load, the vehicle speed and the load torque.

6. A non-transitory computer-readable storage medium, which stores the computer program, that, when executed by a processor of an electronic device, causes the processor of the electronic device to implement operations for determining a coasting torque, comprising:

obtaining operating parameters of the electric vehicle when a fuel cell system of the electric vehicle is out of operation and the electric vehicle enters a coasting state;

determining a theoretical recovery torque and a correction torque of the electric vehicle according to the operating parameters, wherein the correction torque comprises an additional torque of the fuel cell system, and the additional torque of the fuel cell system is a torque corresponding to an electric energy generated due to continuous reaction of a fuel cell of the fuel cell system after the fuel cell system is out of operation; and correcting the theoretical recovery torque to determine the coasting torque of the electric vehicle according to the correction torque, and controlling the electric vehicle to perform energy recovery according to the coasting torque in a coasting process of the electric vehicle;

wherein the operating parameters comprise a driving mode, a coasting-energy-recovery-level and a vehicle speed of the electric vehicle, the operation of determining the theoretical recovery torque and the correction torque of the electric vehicle according to the operating parameters comprises:

determining the theoretical recovery torque of the electric vehicle according to the driving mode of the electric vehicle, the coasting-energy-recovery-level and the vehicle speed, and a pre-calibrated mapping relationship between a driving mode, a coasting-energy-calibrated mapping relationship between the driving mode, the coasting-energy-recovery-level, the vehicle speed and the theoretical recovery torque.

7. An electronic device applied to an electric vehicle, comprising:

a memory which stores a computer program;

one or more multimedia components;

an input/output interface;

a communication component configured to perform a wired or wireless communication between the electronic device and the electric vehicle;

a processor configured to execute the computer program stored in the memory so as to implement steps of a method for determining a coasting torque, comprising:

obtaining operating parameters of the electric vehicle when a fuel cell system of the electric vehicle is out of operation and the electric vehicle enters a coasting state;

determining a theoretical recovery torque and a correction torque of the electric vehicle according to the operating parameters, wherein the correction torque comprises an additional torque of the fuel cell system, and the additional torque of the fuel cell system is a torque corresponding to an electric energy generated due to continuous reaction of a fuel cell of the fuel cell system after the fuel cell system is out of operation; and correcting the theoretical recovery torque to determine the coasting torque of the electric vehicle according to the correction torque, and controlling the electric vehicle to perform energy recovery according to the coasting torque in a coasting process of the electric vehicle;

wherein the operating parameters comprise a driving mode, a coasting-energy-recovery-level and a vehicle speed of the electric vehicle, the processor is configured to implement the step of determining the theoretical recovery torque and the correction torque of the electric vehicle according to the operating parameters by:

determining the theoretical recovery torque of the electric vehicle according to the driving mode of the electric vehicle, the coasting-energy-recovery-level and the vehicle speed, and a pre-calibrated mapping relationship between a driving mode, a coasting-energy-calibrated mapping relationship between the driving mode, the coasting-energy-recovery-level, the vehicle speed and the theoretical recovery torque.

8. The electronic device according to claim 7, wherein the processor is configured to implement the step of correcting the theoretical recovery torque according to the correction torque by:

substituting the theoretical recovery torque and the additional torque into a first calculation formula to obtain the coasting torque of the electric vehicle;

the first calculation formula is expressed as $F_t - F_{fc} = F_c$, wherein $F_t$ represents the theoretical recovery torque, $F_{fc}$ represents the additional torque, and $F_c$ represents the coasting torque.

9. The electronic device according to claim 8, wherein the operating parameters comprise an additional power generated by the fuel cell system and the vehicle speed of the electric vehicle, and the electronic device is further configured to perform a step of:

determining the additional torque of the fuel cell system of the electric vehicle according to the additional power and the vehicle speed, and a pre-calibrated mapping relationship between the additional power and the vehicle speed, and the additional torque.

10. The electronic device according to claim 7, wherein the correction torque further comprises a load torque, and the electronic device is further configured to implement the step of correcting the theoretical recovery torque according to the correction torque by:

substituting the theoretical recovery torque, the additional torque and the load torque into a second calculation formula to determine the coasting torque of the electric vehicle;

wherein, the second calculation formula is expressed as: $F_t - F_{fc} + F_{fmp} = F_c$, wherein $F_t$ represents the theoretical recovery torque, $F_{fc}$ represents the additional torque, $F_c$ represents the coasting torque, and $F_{fmp}$ represents the load torque.

11. The electronic device according to claim 10, wherein the operating parameters comprise a power consumption of a load of the electric vehicle and the vehicle speed of the electric vehicle, and the electronic device is further configured to perform a step of:

determining the load torque of the electric vehicle according to the power consumption of the load and the vehicle speed, and a pre-calibrated mapping relationship between the power consumption of the load, the vehicle speed and the load torque.

* * * * *